United States Patent
Trumbić et al.

(10) Patent No.: US 12,449,019 B2
(45) Date of Patent: Oct. 21, 2025

(54) DRIVETRAIN

(71) Applicant: Rimac Technology D.O.O., Sveta Nedelja (HR)

(72) Inventors: Niko Trumbić, Zagreb (HR); Luka Milek, Koprivnica (HR)

(73) Assignee: RIMAC TECHNOLOGY D.O.O., Sveta Nedelja (HR)

( * ) Notice: Subject to any disclaimer, the term of this patent is extended or adjusted under 35 U.S.C. 154(b) by 0 days.

(21) Appl. No.: 18/462,671

(22) Filed: Sep. 7, 2023

(65) Prior Publication Data
US 2024/0077132 A1 Mar. 7, 2024

(30) Foreign Application Priority Data

Sep. 7, 2022 (EP) .................... 22194279

(51) Int. Cl.
*F16H 1/22* (2006.01)
*B60K 17/04* (2006.01)
*F16H 57/02* (2012.01)

(52) U.S. Cl.
CPC .............. *F16H 1/22* (2013.01); *B60K 17/04* (2013.01); *F16H 57/02* (2013.01); *F16H 2057/02043* (2013.01)

(58) Field of Classification Search
CPC .. F16H 1/22; F16H 57/02; F16H 2057/02043; B60K 17/04
USPC ........................................................ 74/665 L
See application file for complete search history.

(56) References Cited

U.S. PATENT DOCUMENTS

| 3,168,665 | A  | * | 2/1965  | Holper    | H02K 7/125  |
|           |    |   |         |           | 310/83      |
| 10,228,054| B1 | * | 3/2019  | Wittig    | F16H 57/12  |
| 2019/0190348 | A1 |   | 6/2019 | Verbridge |             |
| 2021/0381587 | A1 | * | 12/2021 | Williams | B60K 17/043 |
| 2022/0048375 | A1 | * | 2/2022 | Takahashi | F16H 48/10  |
| 2023/0088004 | A1 | * | 3/2023 | Okita     | B60K 6/547  |
|           |    |   |         |           | 475/5       |
| 2023/0219410 | A1 | * | 7/2023 | Lemaire   | F16H 37/0806|
|           |    |   |         |           | 180/65.7    |

FOREIGN PATENT DOCUMENTS

WO       2017211793     12/2017

OTHER PUBLICATIONS

EPO, Extended European Search Report for EP Application No. 22194279.0, Feb. 15, 2023.

\* cited by examiner

*Primary Examiner* — Victor L MacArthur
(74) *Attorney, Agent, or Firm* — Hodgson Russ LLP

(57) ABSTRACT

Disclosed is a drivetrain comprising a frame defining a central plane respectively opposite half-spaces, and two driving lines housed in such half-spaces; the driving lines comprise respective torque input elements and torque output elements, and they further comprise at least a cross-plane intermediate element adapted to transmit torque coming from the first or from the second torque input towards the first or to the second torque output and across said central plane.

6 Claims, 11 Drawing Sheets

DRIVETRAIN

CROSS-REFERENCE TO RELATED APPLICATION

This application claims priority to European Patent Application No. 22194279.0, filed Sep. 7, 2022, the entire disclosure of which is incorporated herein by reference.

FIELD OF THE INVENTION

The present invention pertains to the technical field of drivetrains or gearboxes, which are typically connected between one or more power sources, such as for example electric motors, and one or more driving wheels (or axles connected to such driving wheels) of a vehicle, and to a vehicle housing one or more of such drivetrains or gearboxes.

BACKGROUND OF THE INVENTION

It is known in the art that torque generated by a vehicle's motor or engine may be transmitted "indirectly" to the driving wheels of the vehicle itself, e.g. in view of the need of multiplying the torque through gearboxes and/or similar devices (like CVT transmissions and so on): drivetrains and/or gearboxes are therefore designed and suitably located within the vehicle structure in order to gain the required torque transfer/multiplication function and in order to guarantee a high degree of reliability and duration.

In the development of electrically-powered vehicles, drivetrain and/or gearboxes play an important role for various reasons, e.g. owing to the fact that electric machines usually operate at very high rotational speed which needs to be reduced to drive the wheels: this often leads to the definition of single reduction ratio drivetrains/gearboxes, or in some limited cases, of drivetrains/gearboxes with a very limited (e.g. no more than two) number of interchangeable transmission ratios (another possible criticality in coupling gearboxes to electric motors consists in the fact that torque is available throughout a wide range of speeds, where in Internal Combustion Engines this is not a case).

In addition to what just stated, it is also to be observed that electrically-powered vehicles can host more than one (electric) engine/motor, and as a consequence of this gearboxes/drivetrains should be designed and built in order to properly handle the torque generated by those engines: for example, some gearboxes must accommodate two electrical engines which are mutually placed in a so-called (albeit not-so-likely to occur) "side-by-side" configuration, whereby gearboxes to be mated to this configuration need to have a double driving line which respectively takes the torque inputs of each engine and transfer them to the driving wheels or axles.

In side-by-side twin motor gearbox configurations, each one of the two driving lines, which also needs to provide for a given reduction/multiplication ratio along the line itself, are spatially separated with respect to a central plane so that the engine placed on the "right" side of this central plane gives its output to the driving axle located in the right-sided half-space while the engine placed on the "left" side of the central plane gives its output to the driving axle located in the left-sided half-space.

These peculiar (and known-type) drivetrain/gearboxes architectures are suffering from an inherent cumbersomeness, which in turn is due to the fact that each "side" of the gearbox must contain and support components of each driving line lying in a dedicated and "separated" half-space with respect to the central plane of the gearbox itself, and this leads to an overall "width" of the gearbox which takes up space within the vehicle structure and which also implies an increase of total weight of the entire vehicle.

Furthermore, the division in half-spaces of the drivetrain/gearbox is often related to the provision of long transversal shafts for supporting the gears which actually implement each driving line, and such long shafts require thorough and supplementary support by means of suitable bearings: this leads to a cost increase of the drivetrain/gearbox and to a further increase of the overall dimensions (since suitable housing spaces for such bearings must be made in the gearbox housing and/or the central plate which is usually located in correspondence of the mid-section of the gearbox itself).

SUMMARY OF THE INVENTION

Therefore having stated the prior art drawbacks, it's an object of the present invention to provide a drivetrain (or gearbox) that can overcome the aforementioned drawbacks, and which is mainly capable of achieving a very high torque input handling capability coming from two or more engines/motors and which is simultaneously capable of achieving a significant compactness and an overall volume/space occupation.

At the same time, the present invention aims to a drivetrain/gearbox whose internal components' disposition and dimensions determines a better productive economy and shorter and easier assembling procedures.

These aims, along with other technical advantages, will be illustrated and achieved by a drivetrain or gearbox according to the present invention as described and claimed hereinafter, and represented in an exemplificative yet not limiting embodiment in the annexed figures.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

Figure 1:
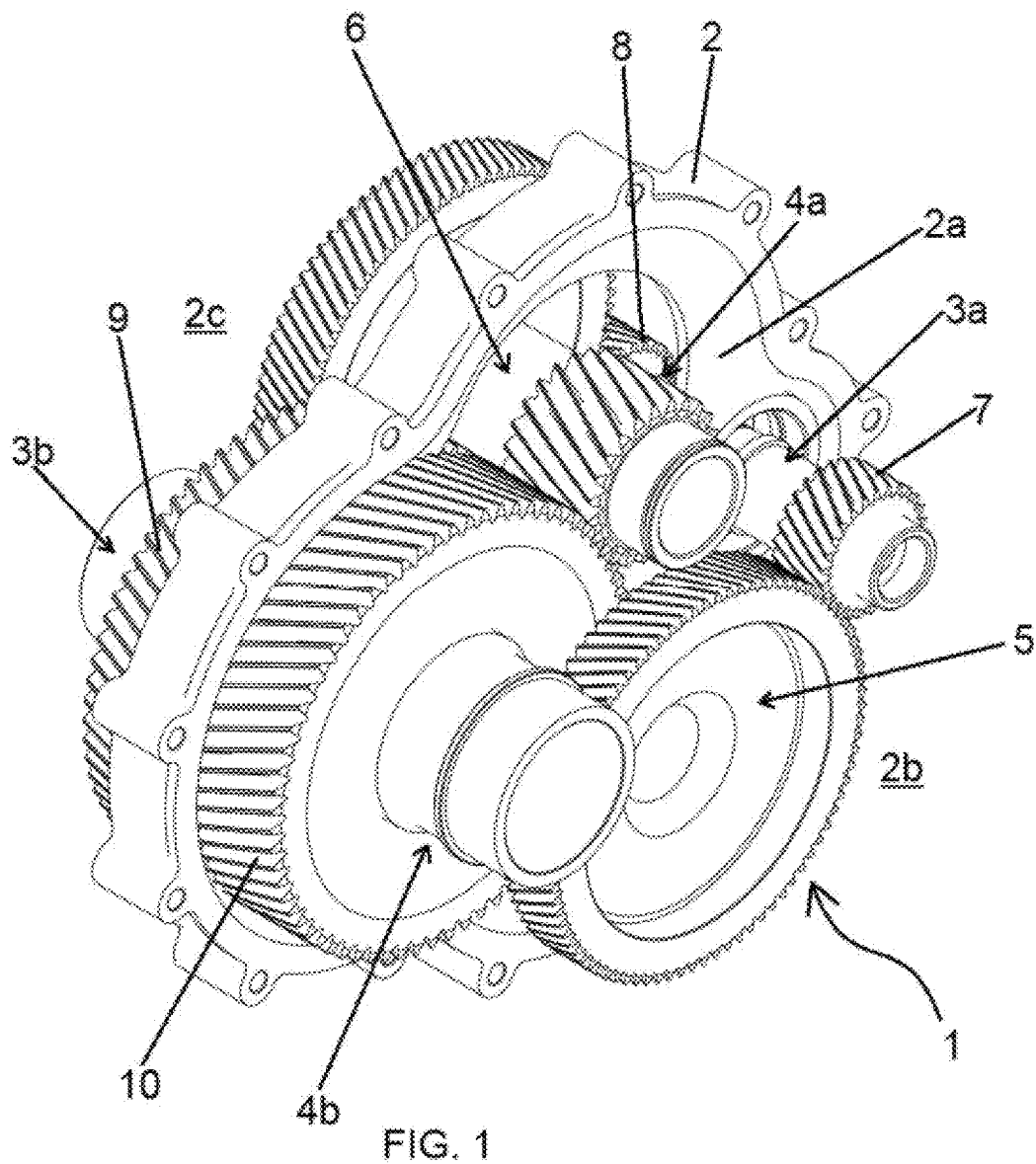
FIG. 1 is a perspective view of a first embodiment of the gearbox/drivetrain according to the invention.
Figure 2:
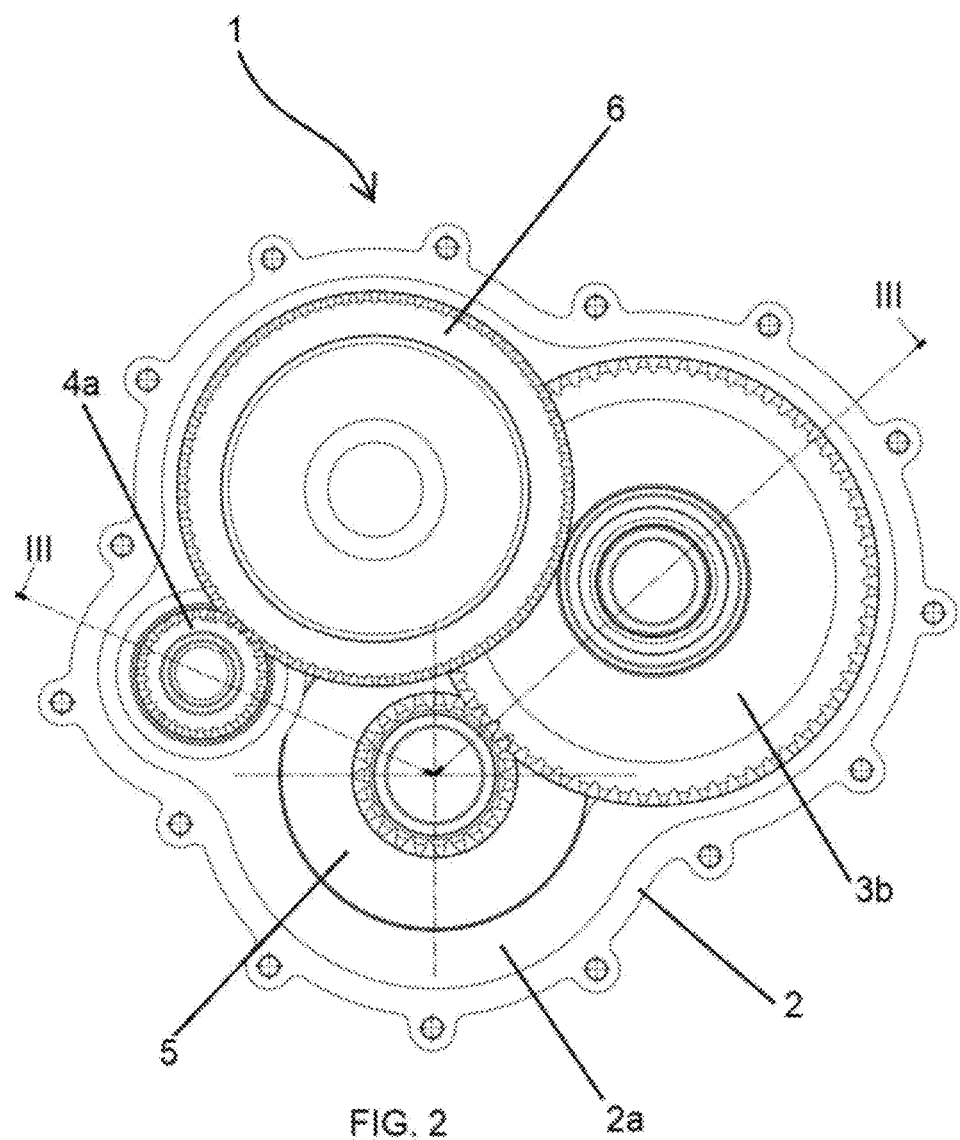
FIG. 2 is a side view of the embodiment shown in FIG. 1.
Figure 3:
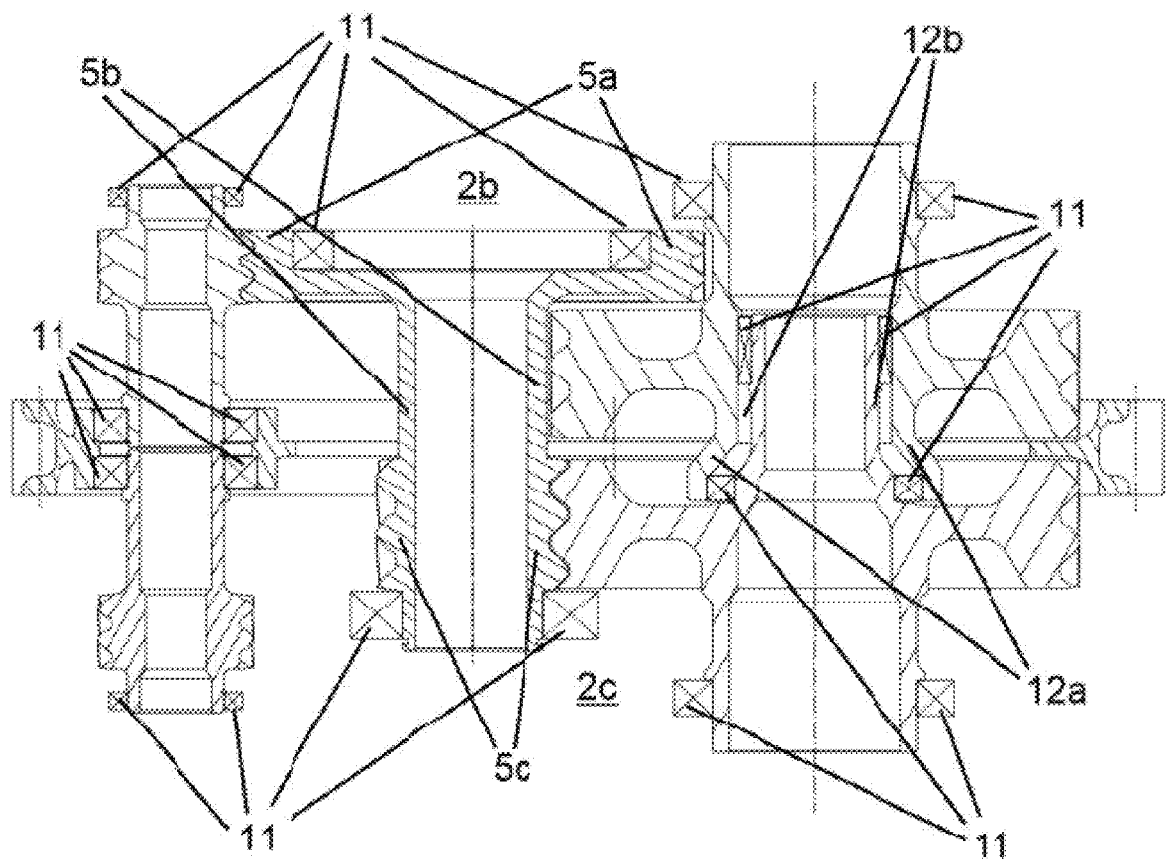
FIG. 3 is a section view of the embodiment shown in FIGS. 1 and 2 along the section plane III-III of FIG. 2.
Figure 4:
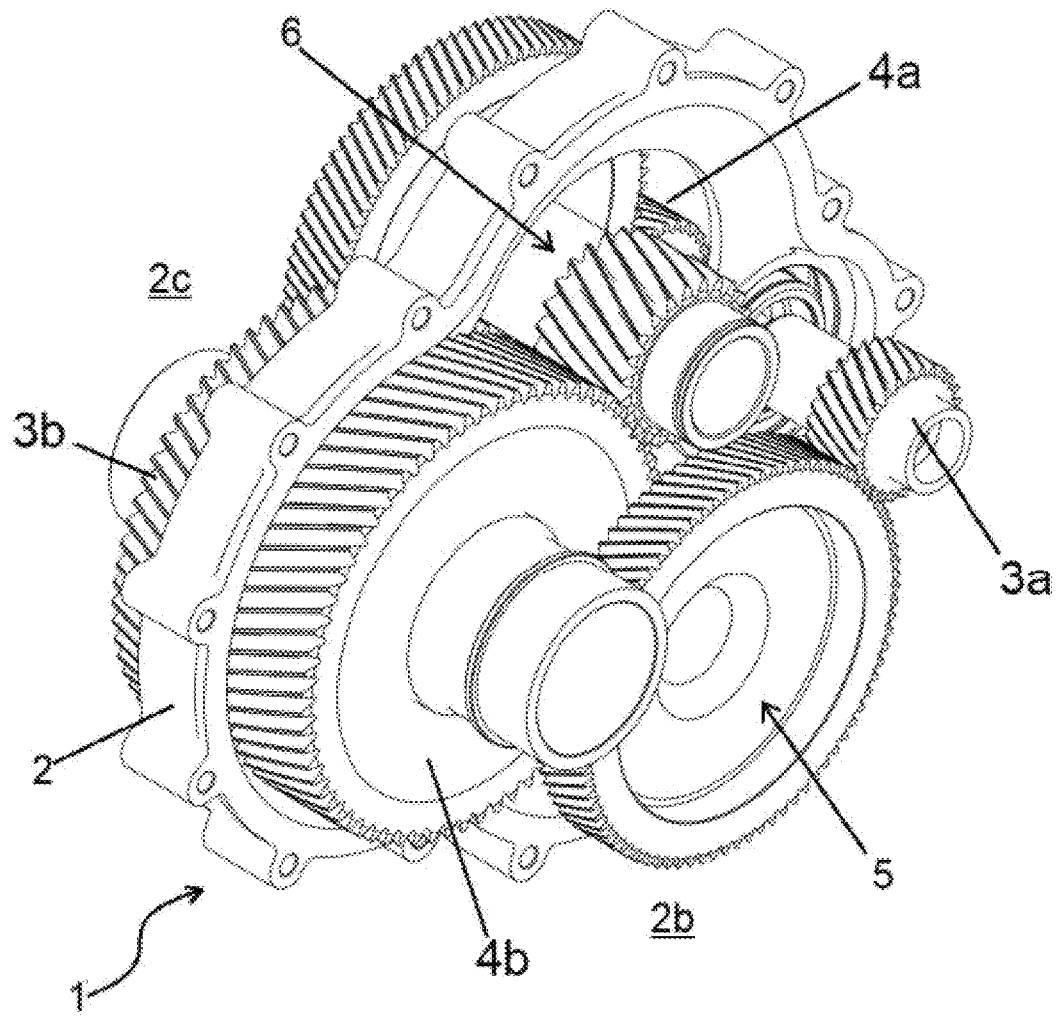
FIG. 4 is a perspective view of a second embodiment of the gearbox/drivetrain according to the invention.
Figure 5:
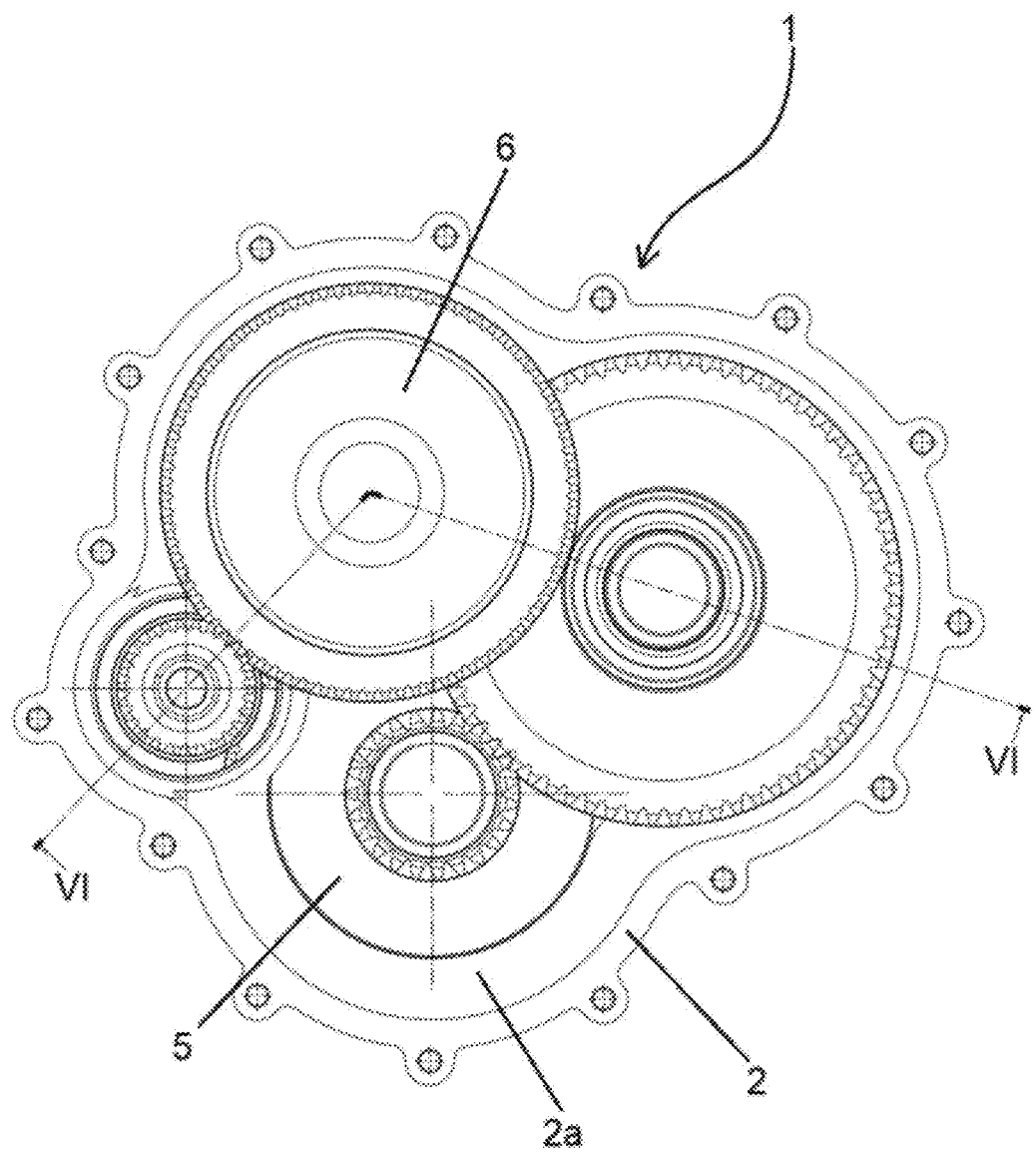
FIG. 5 is a side view of the embodiment shown in FIG. 4.
Figure 6:
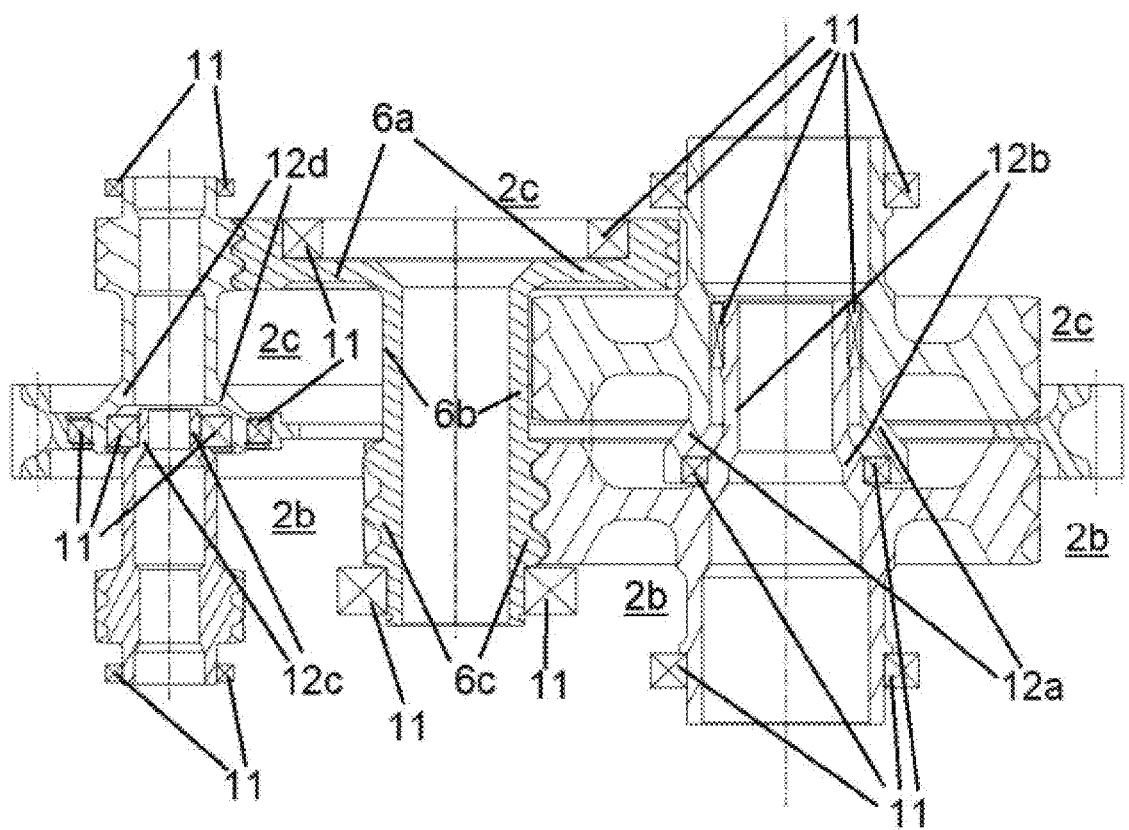
FIG. 6 is a section view of the embodiment shown in FIG. 4 along the section plane VI-VI of FIG. 5.

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The terms, "a" and "an" herein do not denote a limitation of quantity, but rather denote the presence of at least one of the referenced item.

In the annexed figures, the drivetrain/gearbox assembly according to the invention as a whole has been numbered with "1" and it basically comprises a frame (2), which is partially illustrated in the annexed figures (such frame (2), also interchangeable referred to as a gearbox housing (2), may also comprise external covers or shells, which are not depicted in the illustrations but which can be suitably shaped according to the engineering needs) and which defines a central plane (2a) or a central plate (2a), both from the geometrical standpoint and from the physical mechanical standpoint: the central plane (2a) in turn defines a first and second half-spaces (2b; 2c) which lie in a respectively opposite fashion with respect to the central plane (2a) itself.

According to various possible embodiments of the invention, the just cited central plane (2a) can just be ideally defined as a (geometric and non-material) separation surface/entity between the half-spaces (2b) and (2c), or it can be physically embodied by a material element, such as a plate-like element or body essentially resting in the middle of the frame (2) supporting the remaining elements of the gearbox/drivetrain (1) according to the present invention.

Besides, it can be observed that according to the lexicon used for the illustration of the present invention the frame (2) can be considered as having various possible volumetric proportions and/or shapes, so as to properly accommodate and sustain/support the component of the driving lines herebelow cited and claimed and their relative ancillary sub-components, as it will be clarified later on in this description.

In an embodiment, the frame (2) or the gearbox housing (2) has a first motor housing, the central frame (2a) connected to the first motor housing such that the first half-space (2b) enclosing the first motor (100) is defined, and a second motor housing connected to the central frame (2a) such that the second half-space (2c) opposite to said first half-space (2b) enclosing the second motor (200) is defined.

Having in mind what just mentioned, the gearbox/drivetrain (1) also comprises a first and a second driving line which respectively comprise a first input torque element (3a) and a second torque input element (4a)—connectable to two respective torque sources such as electric motors—and a first output torque element (3b) and a second torque output element (4b) respectively placed at opposite ends of each driving line—connectable to wheels or axles of a vehicle.

Advantageously, in the gearbox/drivetrain (1) according to the invention the first and/or the second driving line further comprise at least an intermediate element (5; 6) adapted to transmit torque coming from the first or from the second torque input elements (3a; 4a) towards the first or to the second torque output elements (3b; 4b) and across the just cited central plane (2a): otherwise stated, such an intermediate element (or, as in the embodiments shown in the annexed figures, the two intermediate elements (5; 6)) determine a "mechanical flow path" according to which the torque entering from/in a given half-space is transmitted along the driving line and, in correspondence of the cross-plane intermediate element, is "spatially shifted" in the opposite half-space.

It is now to be observed that the "spatial shift" of the torque flow occurring along the two driving lines allows for an overall design wherein the transversal dimension of the structural components (with respect to the central plane (2a)) can be significantly reduced with respect to known-type gearboxes rated for the same torque handling capabilities: actually, this reduction in overall transversal occupancy is even more advantageously matched with the capability of dealing with torque sources lying in different "half-spaces", so that the overall assembly made by two engines and the gearbox/drivetrain (1) can be hosted in a reduced space within a vehicle (or also, in case of need, bigger and therefore more powerful motors can be hosted in the drivetrain-dedicated space thanks to the reduction of the gearbox/drivetrain cumbersomeness).

Figure 10A:
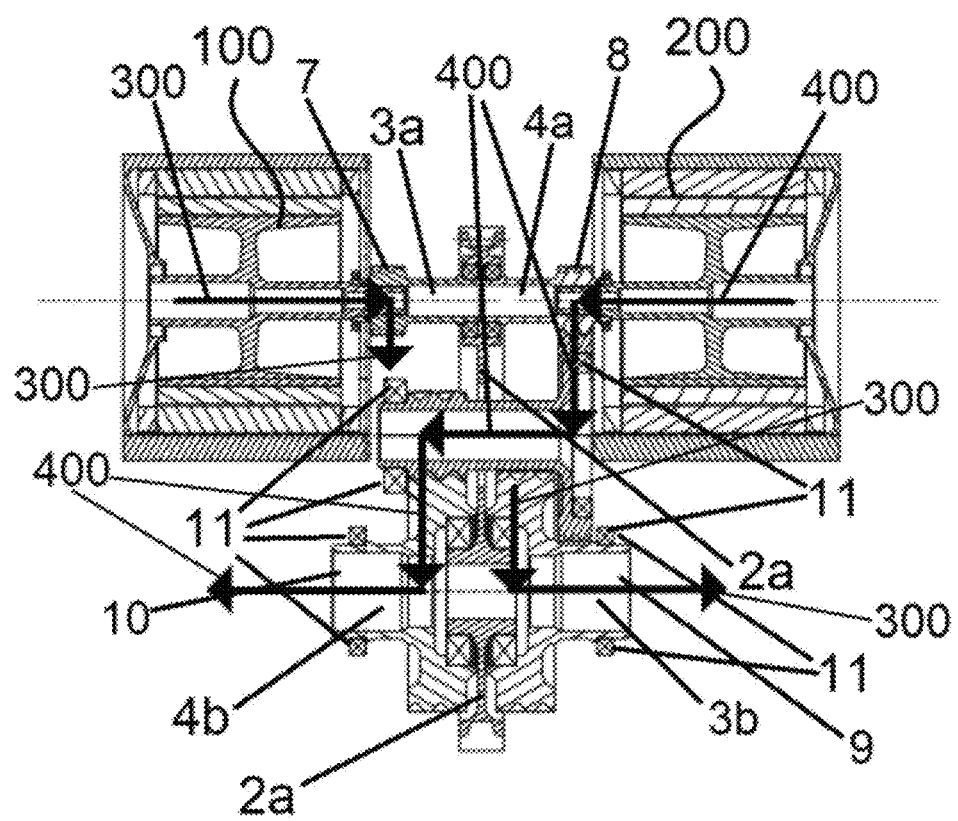
FIG. 10A is a section view of a drivetrain/gearbox assembly according to the invention connected to two electric motors/engines and showing two torque flow paths originating from said motors/engines (such flow paths are represented by schematic arrows (300) and (400), these arrows not representing physical or material structural features of the invention)
Figure 10B:
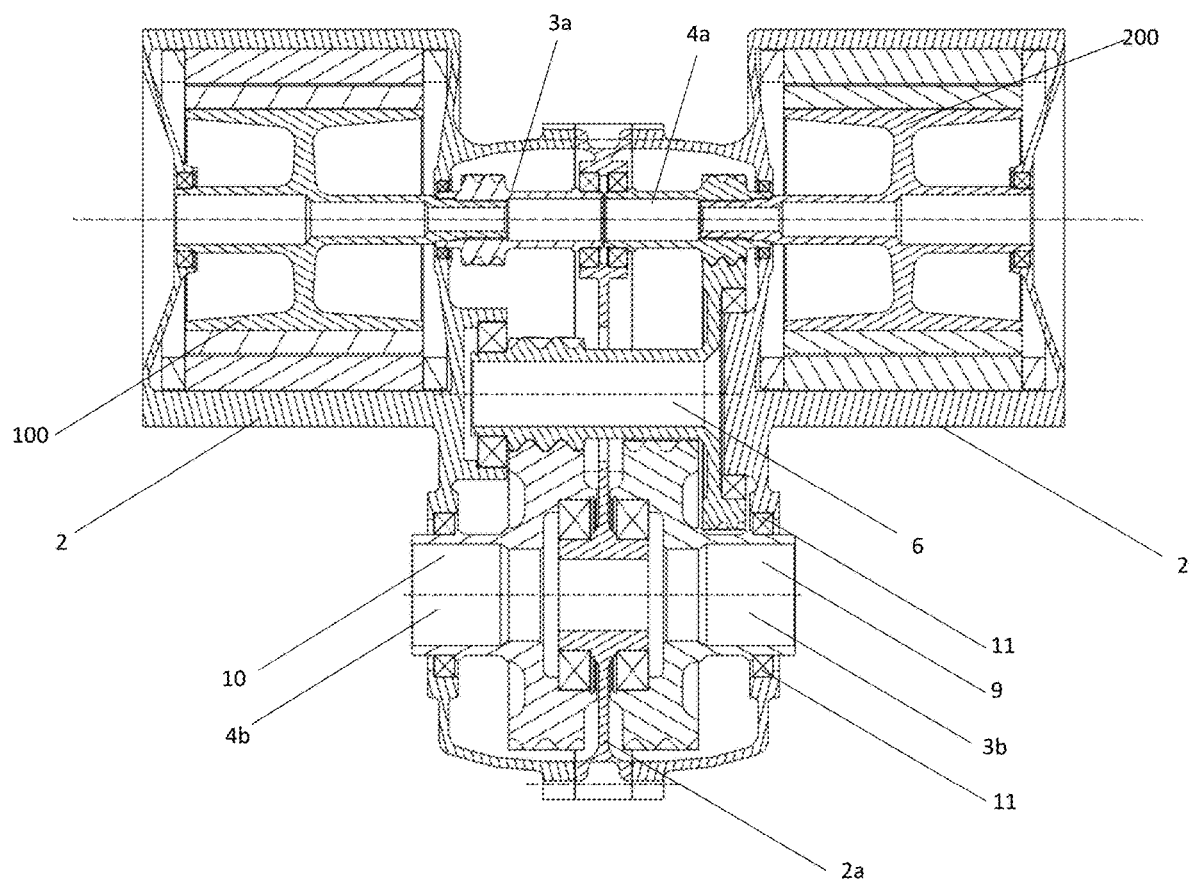
FIG. 10B is another section view of a drivetrain/gearbox assembly.

As exemplificatively seen in the annexed figures, it can be seen that in the illustrated embodiments the mutual location of each driving line component is as follows:

the first torque input element (3a), which is connectable to a first motor (100) (see for example FIGS. 10A, 10B), lies in the first half-space (2b);

the first torque output element (3b) lies in the second half-space (2c);

the second torque input element (4a), which is connectable to a second motor (200) (see, again, FIGS. 10A, 10B), lies in the second half-space (2c); and the second torque output element (4b) lies in the first half-space (2b).

According to the invention, the intermediate element (5) is adapted to transfer a torque flow coming from the first torque input element (3a) towards the first torque output element (3b), while at the same time the intermediate element (6) is adapted to transfer a torque flow coming from the second torque input element (4a) towards the second torque output element (4b). In an embodiment, a first intermediate element (5) extends across the central plate (2a) to connect the first torque input element (3a) with the first torque output element (3b); and a second intermediate element (6) extends across the central plate (2a) to connect the second torque input element (4a) with the second torque output element (4b). Accordingly, the first intermediate element (5) is adapted to transmit torque from the first torque input element (3a) to the first torque output element (3b) across the central plate (2a), and the second intermediate element (6) is adapted to transmit torque from the second torque input element (4a) to the second torque output element (4b) across the central plate (2a).

Specifically, the first intermediate element (5) includes a first end portion, a second end portion and a cross-plane shaft (5b) joining the first end portion and the second end portion. The first end portion includes a first toothed gear (5a) engaged with a gear of the first torque input element (3a), the cross-planer shaft (5b) passes through the central plate (2a) and the second end portion includes a second toothed gear (5c) engaged with a gear of the first torque output element (3b). Likewise, the second intermediate element (6) includes a first end portion, a second end portion and a cross-plane shaft (6b) joining the first end portion and the second end portion. The first end portion includes a first toothed gear (6a) engaged with a gear of the second torque input element (4a), the cross-planer shaft (6b) passes through the central plate (2a) and the second end portion includes a second toothed gear (6c) engaged with a gear of the second torque output element (4b).

Figure 8:
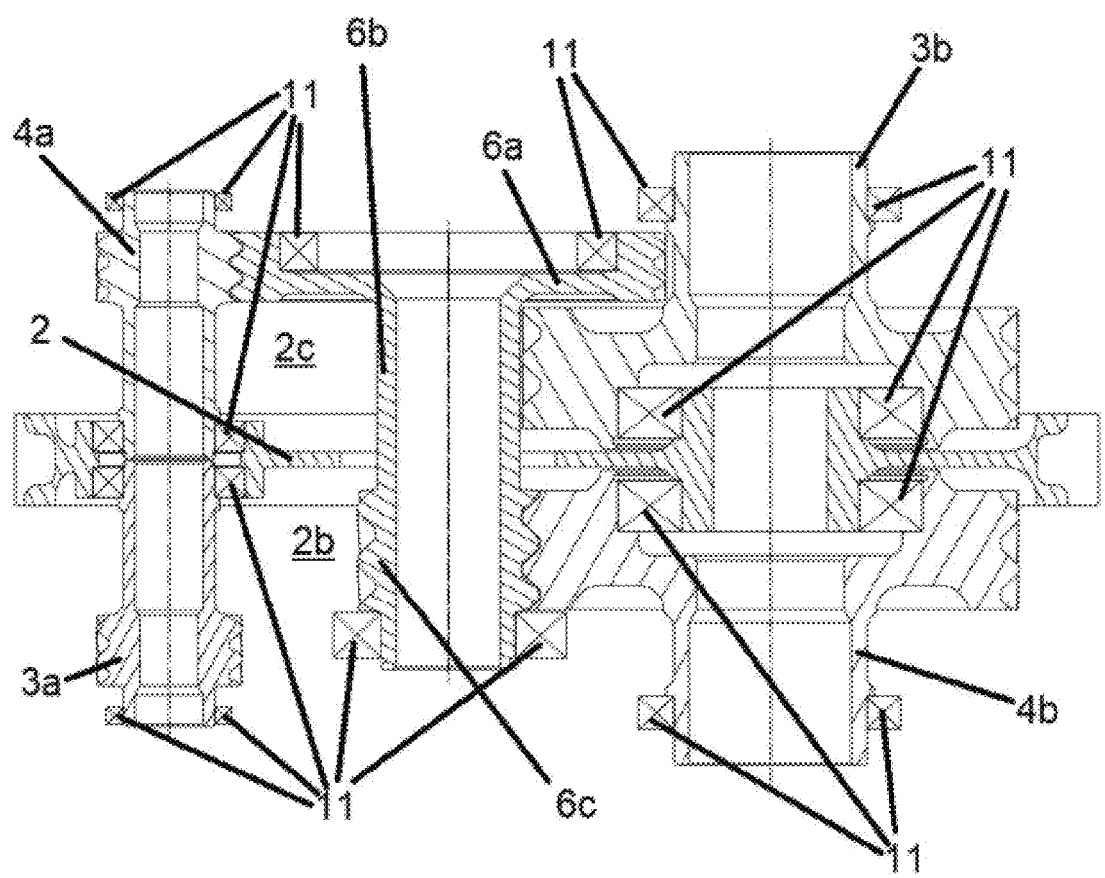
FIG. 8 is a section view of the embodiment shown in FIG. 7 along the section plane VIII-VIII of FIG. 7.
Figure 9:
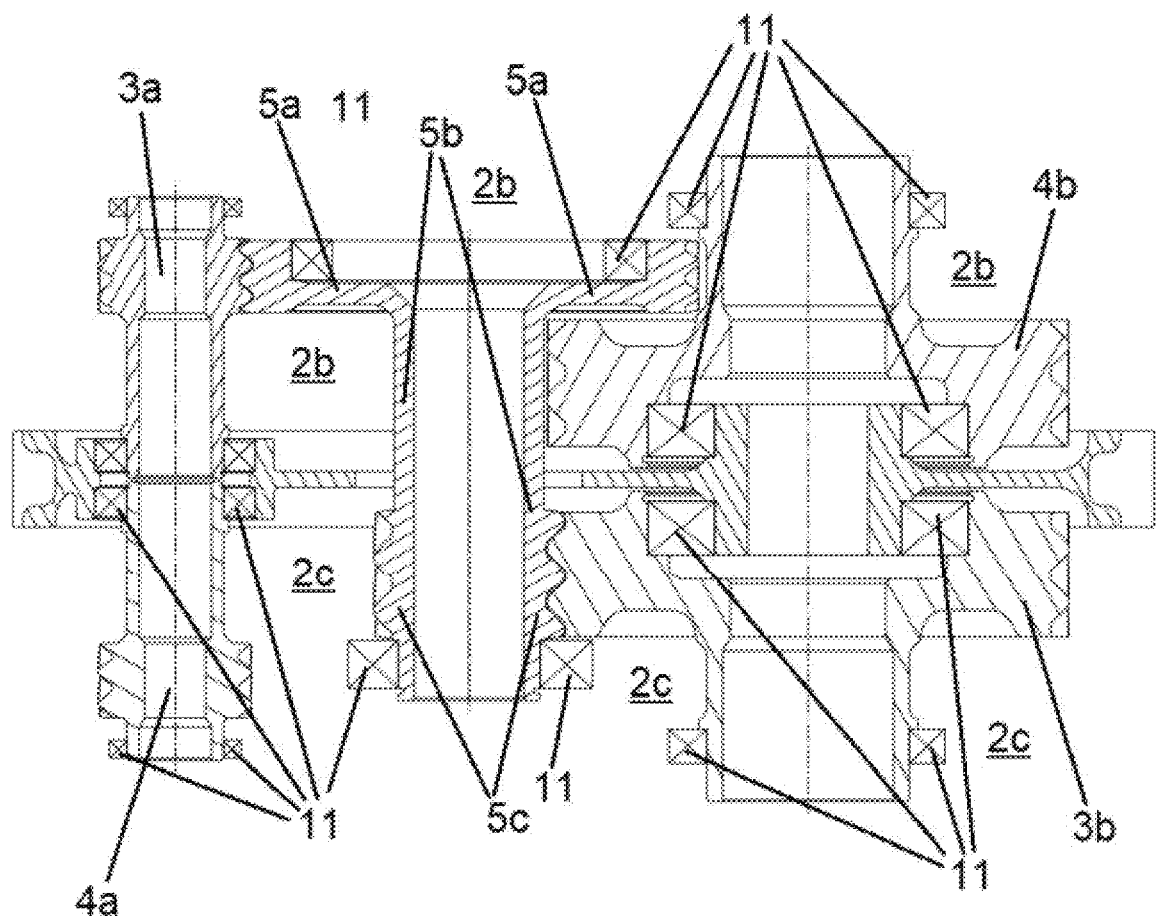
FIG. 9 is a section view of the embodiment shown in FIG. 7 along the section plane IX-IX of FIG. 7.

As shown in FIGS. 8, and 9, at least one of the first motor (100) and the first torque input element (3a) is positioned along a first input axis, at least one of the second motor (200) and the second torque input element (4a) is positioned along a second input axis, the first torque output element (3b) is positioned along a first output axis, and the second torque output element (4b) is positioned along a second output axis, the first intermediate element (5) is positioned along a first intermediate axis, and the second intermediate element (6) is positioned along a second intermediate axis. The first intermediate axis is positioned at an offset from each of the first input axis, the second input axis, the first output axis, the second output axis, and the second intermediate axis. This offset positioning of the first intermediate axis thus the first intermediate element (5), with respect to the second intermediate axis and thus the second intermediate element (6), allows the first motor (100) to be closer to the second motor (200), whereby the drivetrain is allowed to be more compact.

Figure 7:
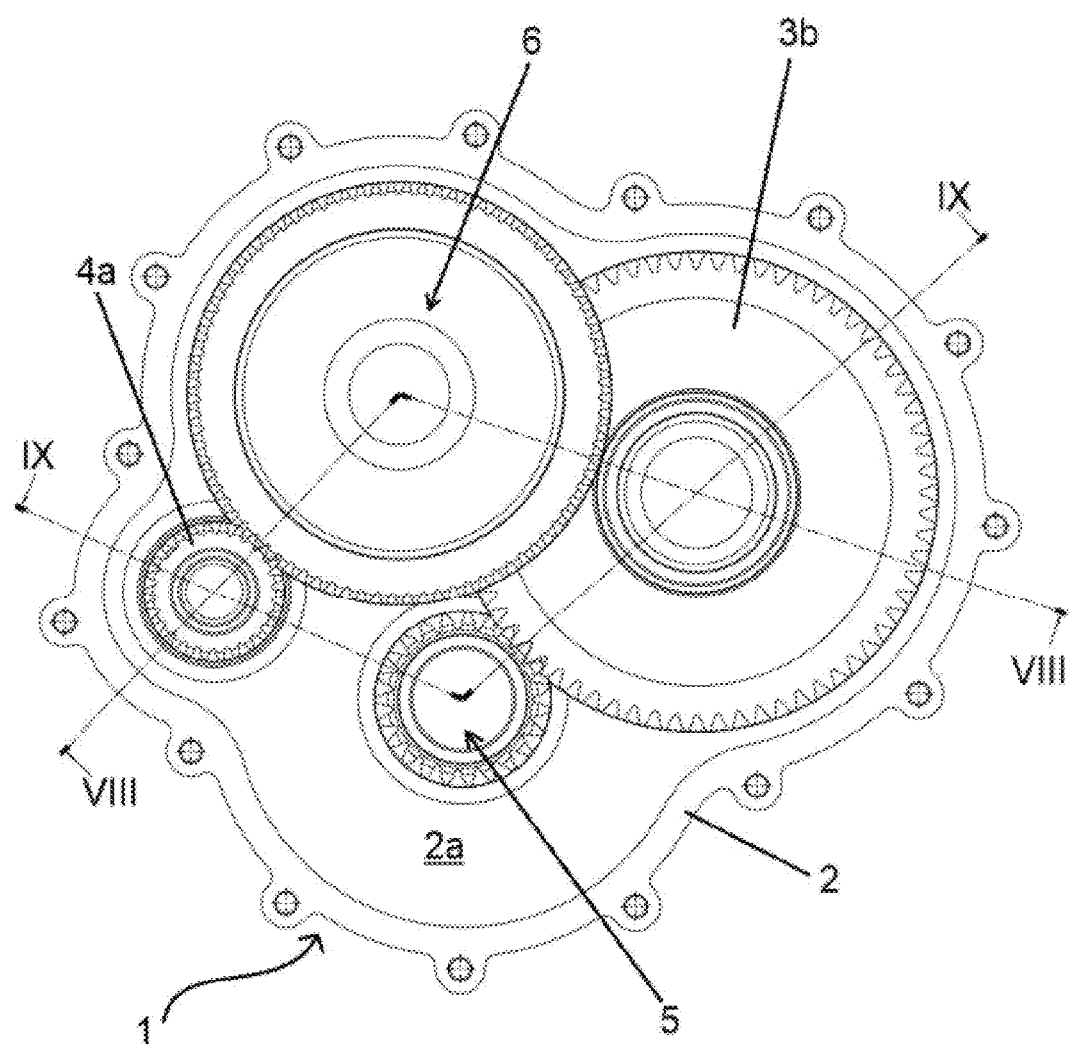
FIG. 7 is a side view of a third embodiment of the gearbox/drivetrain according to the invention.

Further, as shown in FIG. 7, line joining the first intermediate axis with the first input axis forms an angle other than 180 degrees with the line joining the first intermediate axis with the first output axis.

Otherwise stated, the first and second torque input elements (3a; 4a) and their respective first and second torque output elements (3b; 4b), which from a "kinematic chain" standpoint can be regarded as being placed at opposite ends of each driving line, are lying in mutually opposite half-spaces of the gearbox/drivetrain (1), and in this way it can be seen that the intermediate elements (5; 6) can be defined as being "cross-plane intermediate elements" without limiting the scope of the invention (yet with a substantial focus on their main function consisting in operating the "spatial shift" of the torque flow as hereabove cited).

Delving deeper into details, it can be seen that the first and/or the second driving line further comprise a first driven attachment (7; 8) which is (respectively) connected to the first or to the second torque input element (3a) or (4a) (such driven attachments (7; 8) are typically connectable to an engine, which in turn can be an electric engine), and a second driven attachment (9; 10) which is connected to the first or to said second torque output elements (3b) or (4b) and which are typically connectable to an axle or to a wheel: this stated, it can be seen that the driving lines host the aforecited cross-plane intermediate elements (5; 6) which therefore are kinematically connected, in each driving line itself, to the respective first driven attachment (7; 8) which is located at the beginning of each driving line and to the second driven attachment (9; 10) which is located at the end of each driving line.

According to the specific implementation of the components of each driving line (which are exemplificatively but not limitedly represented in the annexed drawings as "gears"), an overall transmission ratio for each driving line is defined, and such overall transmission ratio can be fixed (e.g. in a so-called single gear gearbox) or selectively modifiable: beside this, according to any possible operative requirements, the overall transmission ratios of the two driving lines can be identical/equal or can differ.

As already been set into evidence, one or more of the driven attachments (7; 8) and/or the second driven attachments (9; 10) and/or of the cross-plane intermediate elements (5; 6) can comprise toothed or crowned gears: such toothed or crowned gears are conveniently supported by respective shafts, and such shafts are rotationally supported along their respective axis by suitable housings (or, in possible exemplificative yet not limiting embodiments of the invention, by suitable portions of the frame (2)).

According to a further aspect of the present invention, each of the first toothed or crowned gear (5a, 6a) also comprise an inner race supported by bearings: this structural option brings a further advantage consisting in the fact that the drivetrain/gearbox assembly can be furtherly made compact, since the bearing (unlike everywhere else in the gearbox where the bearing is next to gear) can be positioned underneath the gear itself.

In order to achieve maximum mechanical efficiency in the driving lines, the shafts are placed within the frame (2) in a mutually parallel relationship and are transverse—e.g. perpendicular—to the central plane (2a); moreover, according to an aspect of the invention the shafts of the driven attachments (7; 8) or of the second driven attachments (9; 10) can be lying on and rotating around a respective common (or "shared") geometrical axis in order to allow for a perfect alignment of the engines/motors and of the axles which are respectively connectable at the opposite ends/extremities of each driving line.

With regard to the spatial location of the shafts and focusing on the cross-plane intermediate elements (5; 6), it can also be observed that the shafts for these components are mutually displaced (while keeping a mutual parallelism relationship) so that the ideal projection of the shafts of the driven attachments (7; 8), of the second driven attachments (9; 10) and of the cross-plane intermediate elements (5; 6) on the central plane (2a) cooperatively define a so-called "L-shaped" (or "triangular") laying pattern in the frame (2): this particular geometric layout allows for compaction of the gearbox/drivetrain (1) not only in terms of width but also in terms of overall length.

Looking closer at the cross-plane intermediate elements (5; 6), it can be seen that in the depicted embodiments they respectively comprise a first toothed or crowned gear (5a; 6a) residing in the first half-space (2b) or in the second half-spaces (2c), a cross-plane shaft (5b; 6b) protruding from the respective first toothed or crowned gear (5a; 6a) through the central plane (2a) and a second toothed or crowned gear (5c; 6c) residing in the second half-space (2c) or in the first half-space (2b) and supported by the just cited cross-plane shaft (5b; 6b): thanks to the cross-plane shaft, the torque flow coming from one half-space is driven into the other/opposite half-space, obtaining the main technical effect of the present invention as already described above.

It should now be noted that according to the invention other kinematic devices may be used for defining the driving lines and/or its respective sub-components, such as belt drives, chain drives or whatever else is known to a skilled technician operating in the technical field of the invention itself: such alternative or functionally equivalent technical means can therefore be implemented without exceeding from the scope of the present invention.

It is to be noted that according to the invention, the driving lines may comprise more than three gears, and in this case they can be defined as "gear trains" or "gear cascades": in these possible alternative embodiments of the invention, more than one cross-plane intermediate elements (5; 6) can be present in such gear trains/cascades, provided that at least in a given stage of such driving line the torque coming as an input in one half-space to be transferred as an output in the other opposite half-space defined by the frame (2) of the gearbox/drivetrain (1).

Referring to the teaching just disclosed, it can therefore be seen that in case of a gear train/cascade wherein an even number (e.g. two, four, six or more) of cross-plane intermediate elements (5; 6) is present, the torque input coming from a given half-space is transferred as an output in the same half-space, while an odd number (e.g. one, three, five, seven or more) of cross-plane intermediate elements (5; 6) is present, the torque input coming from a given half-space is transferred as an output in the opposite half-space; all these possible embodiments are to be considered as falling within the present invention.

In order to give the necessary support and minimization of friction losses, the gearbox/drivetrain (1) may further comprise a predetermined number of bearings (11) which are interposed between the frame (2) and the shafts of the driven attachments (7; 8) and/or of the second driven attachments (9; 10) and/or of the cross-plane intermediate elements (5; 6): such bearings can conveniently be of any known type and can be arranged in suitable portions of the frame (2) and/or of the central plane (2a) according to the design requirements.

The overall/resulting number and location of the bearings (11) can be suitably chosen in order to fulfill various technical requirements: for example, in a possible embodiment of the present invention at least one, and preferably all the cross-plane intermediate element/s (5, 6), is directly supported by at least one housing directly located in the frame (2): such housing is therefore not comprising bearings (11) located in the central plane (2a), and eventually suitably placed and dimensioned bearings (11) related to such cross-plane intermediate element/s (5; 6) can be resting in/on portions of the frame (2) not defining or belonging to the central plane (2a).

Referring now to a further aspect of the present invention, and focusing in particular on the embodiment depicted in figures from 3 and 6, it can be seen that the shafts of the driven attachments (7; 8) and/or of the second driven attachments (9; 10) are mutually facing each other in correspondence of the central plane (2a) of the frame (2), but in the embodiments depicted in figures from 1 to 6 the shafts of the driven attachments (7; 8) and/or of the second driven attachments (9; 10) can be (at least partially) set into a mutual compenetration structural architecture: to this aims, the shafts may further comprise cross-plane protruding extremities (12a; 12b; 12c; 12d) which mutually compenetrate across the central plane (2a) of the frame (2).

The benefits deriving from the mutual (and at least partial) compenetration of the shafts essentially consist in the fact that this geometric relationship helps in shortening the shafts themselves (and this results in an even more enhanced reduction of width for the whole gearbox/drivetrain (1)) and in the fact that such a mutual compenetration allows for a reciprocated self-centering effect which is directly acting on both shafts: this allows for a reduction of productive costs.

It is to be observed that the cross-plane protruding extremities (12a; 12b; 12c; 12d) associated to the shafts of the driven attachments (7; 8) and/or of the second driven attachments (9; 10) can be devised and implemented independently from the other features of the present invention, and it can also be observed that according to different possible embodiments of the invention, the driven attachments (7; 8) and/or of the second driven attachments (9; 10) can be mutually compenetrating in various depths/lengths proportions according to design needs and taking into account the capability of withstanding a given amount of torque input (from the engines/motors) or whatever else can come into the calculations or into the operating conditions in terms of mechanical or thermal stresses.

From an overall structural architecture standpoint, it can be observed that the protruding extremities (12a; 12b; 12c; 12d) essentially define a so-called "shaft-in-shaft" configuration or layout, wherein mutually opposite ends of the hereabove cited—and herebelow claimed—shafts are at least partially "nested" one within the other.

The described, illustrated and claimed invention achieves the aforecited technical aims and surpasses the shortcomings of the prior art hereabove mentioned, starting but not being limited to the advantage consisting in a very high degree of volumetric compactness joined with the capability of dealing with an arbitrarily high amount of torque coming from at least two electric motors arranged in a so-called "side-by-side" architecture (that is, and according to the wording and the figures defining the lexicon of the present invention, an architecture wherein at least two motors are facing each other and are connected to a gearbox receiving torque inputs from opposite half-spaces).

Besides, the overall structural architecture of the drivetrain/gearbox requires a limited overall number of bearings and allows for the settlement of a significative number of "shortened" shafts for the supporting of the crowned gears (and in particular, a shortening of the torque input and/or torque input shafts), and this once again leads to a rebate of production and assembling costs (which goes along with a high level of reliability, as well).

Furthermore, the overall structure of the present invention can be implemented in various embodiments in order to cope with various ranges of torque outputs, maximum rotations per minute values and whatever else operating parameter which may characterize an electric motor or a couple of electric motors.

Last but not least, the gearbox/drivetrain assembly according to the present invention can also be implemented in any other embodiment enclosed in its inventive concept as claimed, also by way of collateral modifications available to a skilled technician in the technical sector of pertinence of the invention itself, and thus maintaining the functional achievements of the invention along with practicality of production, usage, assembly and maintenance.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enabling others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A drivetrain for a vehicle, the drivetrain comprising:
a frame defining a central plane and a first half-space and a second half-space opposite to said first half-space with respect to said central plane; and
a first driving line and a second driving line supported by said frame and respectively comprising a first torque input element and a second torque input element, and a first torque output element and a second torque output element;
wherein the first driving line and the second driving line further comprise one or more intermediate elements adapted to transmit torque coming from the first torque input element or from the second torque input element towards the first torque output element or to the second torque output element and across the central plane;
wherein:
said first torque input element lying in the first half-space;
said first torque output element lying in the second half-space;
said second torque input element lying in the second half-space; and
said second torque output element lying in the first half-space;
wherein said one or more intermediate elements are cross-plane intermediate elements transferring a torque flow coming from the first torque input element or coming from the second torque input element respectively towards the first torque output element or towards the second torque output element;
wherein the cross-plane intermediate elements comprise a first intermediate element adapted to transfer a torque flow coming from the first torque input element towards the first torque output element, and a second intermediate element adapted to transfer a torque flow coming from the second torque input element towards the second torque output element;
wherein said first half-space and said second half-space are mutually opposite with respect to the central plane, such central plane being an ideal geometric plane or a material element, said material element comprising a plate-like element belonging to the frame;
wherein each of the first driving line and the second driving line further comprises:
a first driven attachment connected to said first torque input element or to said second torque input element or and connectable to an engine, said engine being an electric engine; and
a second driven attachment connected to said first torque output element or to said second torque output element and connectable to an axle or to a wheel;
wherein said cross-plane intermediate elements being kinematically connected to said first driven attachment and to the second driven attachment in order to define a predetermined overall transmission ratio;
wherein one or more of said first driven attachment, said second driven attachment and the cross-plane intermediate elements respectively comprise toothed or crowned gears, said toothed or crowned gears being supported by respective shafts, said shafts being rotationally supported along their respective axis by the frame and by the central plane;
wherein said shafts are placed within the frame in a mutually parallel relationship and are transverse, and perpendicular to the central plane, the shafts of the first driven attachment or of the second driven attachment being lying on and rotating around a respective common geometrical axis;
wherein the shafts of the cross-plane intermediate elements are mutually displaced, a projection of the shafts of the first driven attachment, of the second driven attachment and of the cross-plane intermediate elements on the central plane cooperatively defining an "L-shaped" laying pattern in the frame;
wherein each of the cross-plane intermediate elements comprises:
a first toothed or crowned gear residing in said first half-space or in said second half-space;
a cross-plane shaft protruding from said first toothed or crowned gear through the central plane; and
a second toothed or crowned gear residing in said second half-space or in said first half-space and supported by said cross-plane shaft;
wherein each of the first toothed or crowned gear also comprise an inner race supported by bearings;
wherein the drivetrain further comprises a predetermined number of bearings interposed between the frame or the central plane and the shafts of the first driven attachment or of the second driven attachment or of the cross-plane intermediate elements;
wherein the cross-plane intermediate elements, being directly supported by at least one housing directly located in the frame without any bearings located in the central plane and comprising bearings on portions of the frame away from the central plane;
wherein the shafts of the first driven attachment and of the second driven attachment are mutually facing each other in correspondence of the central plane of the frame;
wherein the shafts of the first driven attachment or the second driven attachment further comprise cross-plane protruding extremities which mutually compenetrate across the central plane of the frame, said cross-plane protruding extremities defining a shaft-in-shaft configuration for the shafts of the first driven attachment or of the second driven attachment.

2. A drivetrain comprising:
a gearbox housing having a central plate, the central plate dividing the gearbox housing between a first half-space and a second half-space opposite to said first half-space with respect to said central plate;
a first motor positioned within the first half-space of the gearbox housing;
a first torque input element associated with the first motor, and positioned within the first half-space of the gearbox housing, and rotatably supported on the central plate;
a second motor positioned within the second half-space;
a second torque input element associated with the second motor, and positioned within the second half-space, and rotatably supported on the central plate;
a first torque output element rotatably supported on the central plate within the second half-space;
a second torque output element rotatably supported on the central plate within the first half-space;
a first intermediate element extending across the central plate to connect the first torque input element with the first torque output element; and a second intermediate element extending across the central plate to connect the second torque input element with the second torque output element.

3. The drivetrain as claimed in claim 2, wherein:
the first intermediate element is adapted to transmit torque from the first torque input element to the first torque output element across the central plate, and
the second intermediate element is adapted to transmit torque from the second torque input element to the second torque output element across the central plate.

4. The drivetrain as claimed in claim 3, wherein:
the first intermediate element includes a first end portion, a second end portion and a cross-plane shaft joining the first end portion and the second end portion, wherein the first end portion includes a first toothed gear engaged with a gear of the first torque input element, the cross-plane shaft passes through the central plate and the second end portion includes a second toothed gear engaged with a gear of the first torque output element, and
the second intermediate element includes a first end portion, a second end portion and a cross-plane shaft joining the first end portion and the second end portion, wherein the first end portion includes a first toothed gear engaged with a gear of the second torque input element, the cross-plane shaft passes through the central plate and the second end portion includes a second toothed gear engaged with a gear of the second torque output element.

5. The drivetrain as claimed in claim 2, wherein at least one of the first motor and the first torque input element is positioned along a first input axis, at least one of the second motor and the second torque input element is positioned along a second input axis, the first torque output element is positioned along a first output axis, and the second torque output element is positioned along a second output axis, the first intermediate element is positioned along a first intermediate axis, and the second intermediate element is positioned along a second intermediate axis, wherein the first intermediate axis is positioned at an offset from each of the first input axis, the second input axis, the first output axis, the second output axis, and the second intermediate axis.

6. The drivetrain as claimed in claim 5, wherein a line joining the first intermediate axis with the first input axis forms an angle other than 180 degrees with the line joining the first intermediate axis with the first output axis.

* * * * *